Jan. 7, 1969     J. W. MEARS ET AL     3,420,310

FIREFIGHTING FOAM GENERATOR

Filed April 11, 1967

INVENTORS.
JAMES W. MEARS
PHILIP H. MERDINYAN
BY *Herman Foster*
ATTORNEY

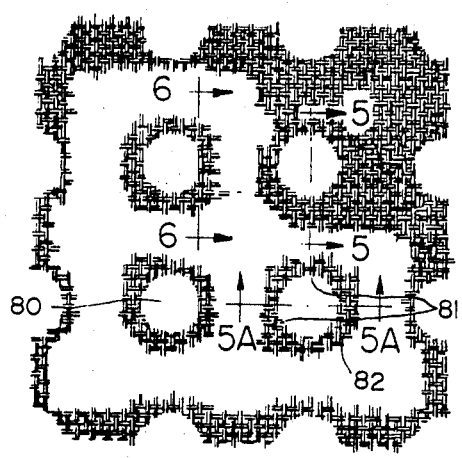
FIG. 4
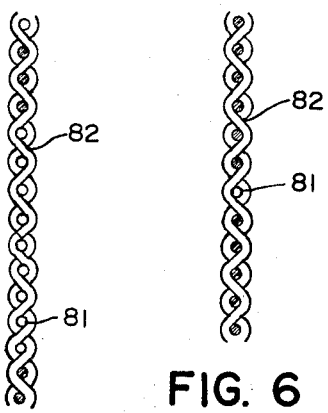
FIG. 5A
FIG. 5      FIG. 6
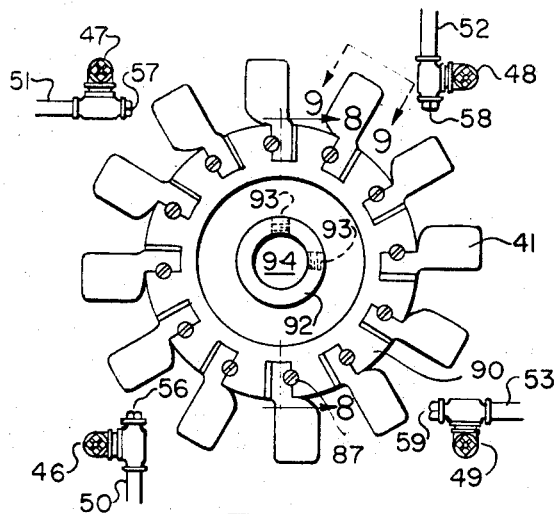
FIG. 7
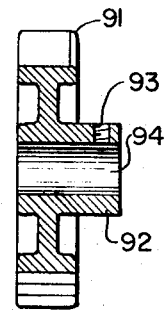
FIG. 8
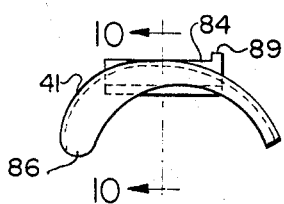
FIG. 9
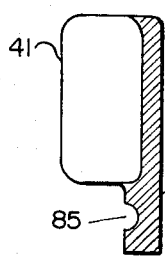
FIG. 10
INVENTORS.
JAMES W. MEARS
PHILIP H. MERDINYAN
BY Herman Foster
ATTORNEY United States Patent Office 3,420,310
Patented Jan. 7, 1969

3,420,310
FIREFIGHTING FOAM GENERATOR
James W. Mears, Providence, and Philip H. Merdinyan, East Greenwich, R.I., assignors to Grinnell Corporation, Providence, R.I., a corporation of Delaware
Filed Apr. 11, 1967, Ser. No. 630,025
U.S. Cl. 169—15
Int. Cl. A62c 35/46; B05b 1/26
14 Claims

ABSTRACT OF THE DISCLOSURE

Apparatus for generating firefighting foam having a wind tunnel configuration with a fan at the inlet end and a metal screen at the outlet end and nozzles between the fan and the screen for discharging a foam making solution onto an impeller wheel which drives the fan to generate an airstream. The solution deflected from the impeller wheel is sprayed onto the screen and is formed into foam bubbles and carried out of the outlet end by the airstream.

Background of the invention

This invention relates generally to the field of firefighting in which a foam making solution rather than water alone is used as a fire extinguishing medium. A more particular field to which this invention pertains is an apparatus embodying a system in which a main liquid stream in passing to the discharge point of the apparatus is modified by adding a foam compound and then is dispersed by an air stream to deliver it to the fire to be extinguished.

Description of the prior art

This form of foam application is an outgrowth of a method of fighting fires in underground mines which is more fully described in the following publications:

Eisner and Smith: "Fire Fighting in Underground Roadways; Experiments With Foam Plugs; Safety in Mine Research Establishment" (British Research Report No. 130, June 1956).

Exhibit 2, E. T. Linacre, "Practical Aspects of the Foam-Plug Method of Fighting Large Mine-Airway Fires." Research Report No. 171, February 1959, Ministry of Power, Great Britain.

Exhibit 3, E. T. Linacre, "Materials and Equipment for the Foam-Plug Method of Mine Firefighting." Research Report No. 179, August 1959, Ministry of Power, Great Britain.

Hartmann, Nagy, Barnes and Murphy, "Studies With High-Expansion Foams for Controlling Experimental Coal Mine Fires, A Progress Report," Bureau of Mines Report of Investigations 5419, U.S. Department of the Interior (1958).

Nagy, Murphy and Mitchell, "Controlling Mine Fires With High-Expansion Foam," U.S. Department of the Interior, Bureau of Mines (1960).

Thereafter, self-contained apparatus was devised which made it possible to use the high-expansion foam method of firefighting not only in mine fires but also in building fires. Such apparatus is described more fully in U.S. Patents Nos. 3,142,340, 3,186,490, 3,241,617, 3,244,235, 3,272,263. These patents generally deal with foam generating equipment which contain, broadly, a wind-tunnel structure with a fan at one end and an absorbent net screen at the other end. Intermediate the fan and the screen are spray nozzles so directed as to wet the net with a foam forming solution and maintain a distribution of this solution onto the net while the fan generates a foam forming and distributing airstream which travels through the net.

Subsequent experience has shown that the apparatus of the above listed patents has two major weaknesses:

(1) The fan is driven by an electric motor, thus requiring two major hookups, one for water and one for electricity, and makes the apparatus subject to stoppage during a power failure.

(2) The absorbent cloth net screen is subject to damage from heat and flames if left unprotected prior to the time water is impinged on the net.

To overcome the first of these weaknesses foam generating devices have been developed which utilize water power as the fan driving means thus eliminating the necessity for an electrical hookup. These fan driving means so far as is known are generally in the form of reaction type spray nozzles attached to the fan hub to rotate the fan.

With respect to the second listed weakness, closures in the form of louvers or doors have been developed as shown in U.S. Patent No. 3,142,340 to protect the cloth screen. These have been most widely used although a combination metal screen and plate construction has been disclosed in U.S. Patent No. 3,065,797, to Robert W. Barnes.

Summary

The present invention overcomes both of the above listed weaknesses by a single novel foam generator.

An object of the present invention is the provision of a new and improved firefighting foam generator which is operated by a single source of power, namely water power.

Another object is the provision of a new and improved firefighting foam generator which does not require fire protection means, such as end closures, for its screen.

A further object is the provision of a new and improved firefighting foam generator containing a novel metal screen construction.

Still a further object is the provision of a new and improved firefighting foam generator containing a novel water wheel as the fan driving means and primary foam mixture distributing means onto the metal screen.

Brief description of drawings

The above and other objects and features of the invention will become apparent from the following description and accompanying drawings which describe and show for illustrative purposes only, preferred embodiments, and in which:

FIG. 4 is an enlarged detail view of the screen construction used in the discharge end as seen in FIG. 2.

FIG. 5 is an enlarged section taken along line 5—5 of FIG. 4.

FIG. 5A is an enlarged section taken along line 5A—5A of FIG. 4.

FIG. 6 is an enlarged section taken along line 6—6 of FIG. 4.

FIG. 7 is a partial enlarged section view along line 7—7 of FIG. 1.

FIG. 8 is an enlarged sectional view along line 8—8 of FIG. 7.

FIG. 9 is an enlarged edge view of an impeller blade looking in the direction of 9—9 of FIG. 7.

FIG. 10 is a section view taken along line 10—10 of FIG. 9.

*Description of the preferred embodiments*

Figure 1:
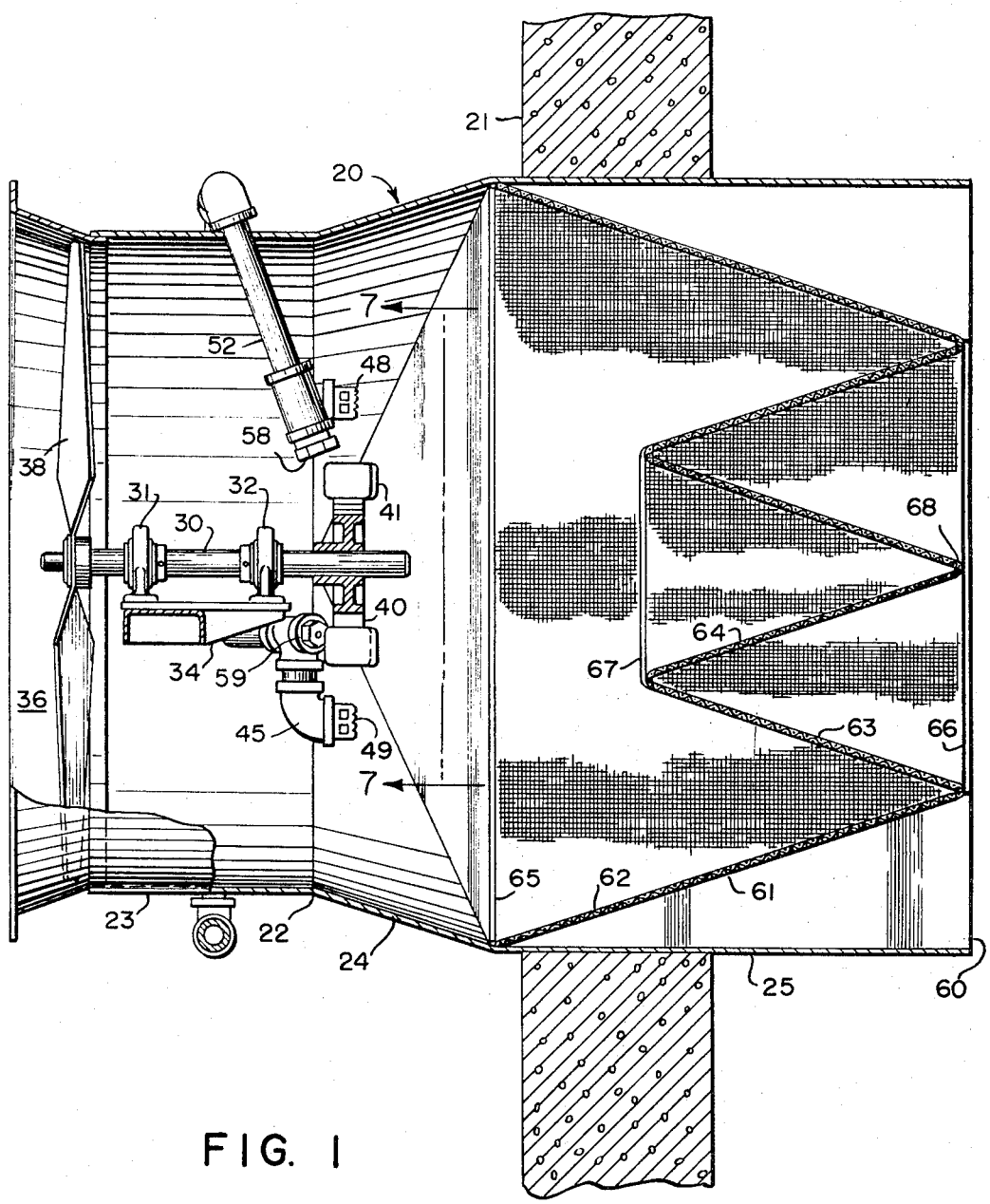
FIG. 1 is a cross-sectional elevation view of a preferred embodiment of the invention installed in a building wall.
Figure 2:
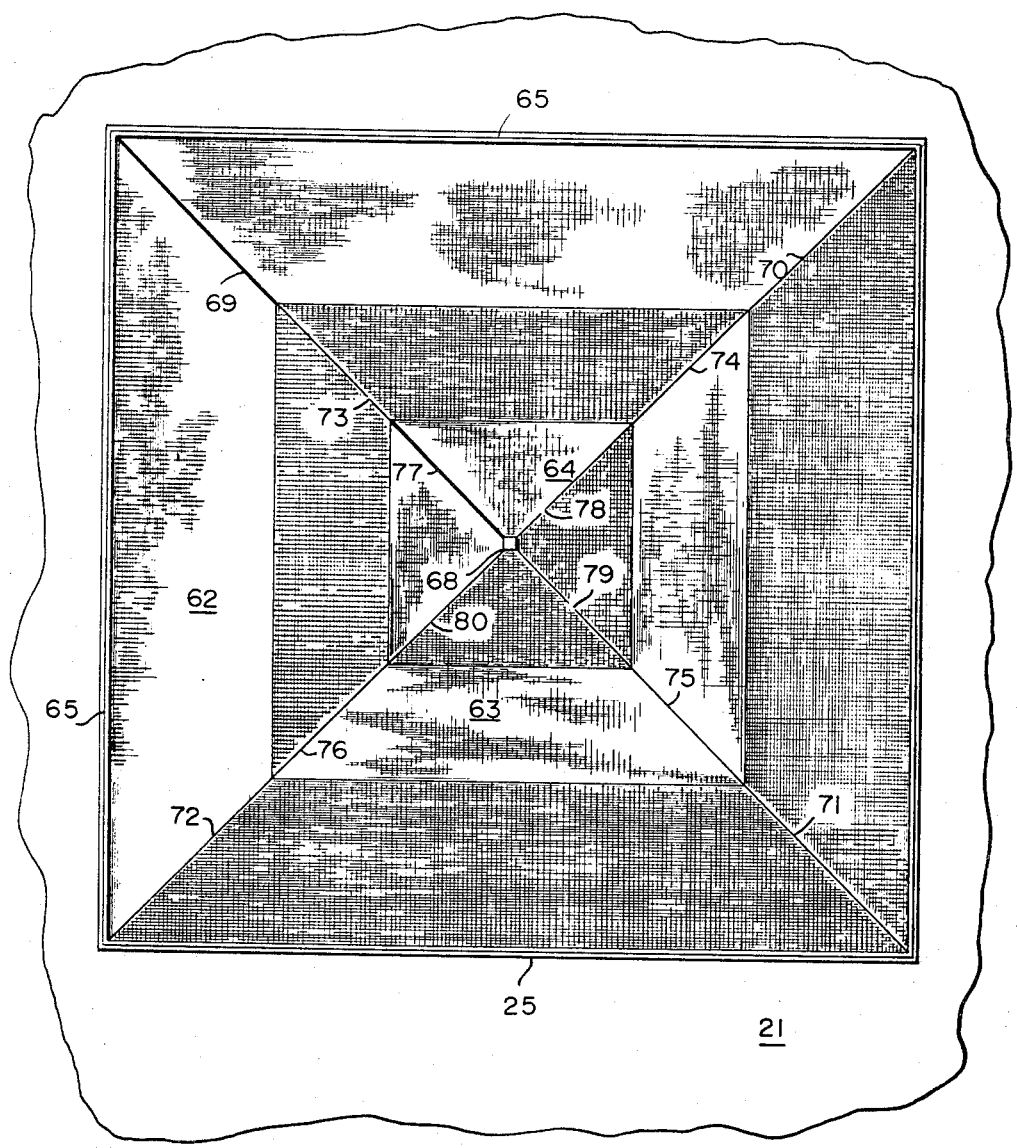
FIG. 2 is an end view from the discharge end of the embodiment of FIG. 1 showing the screen configuration in the discharge opening.
Figure 3:
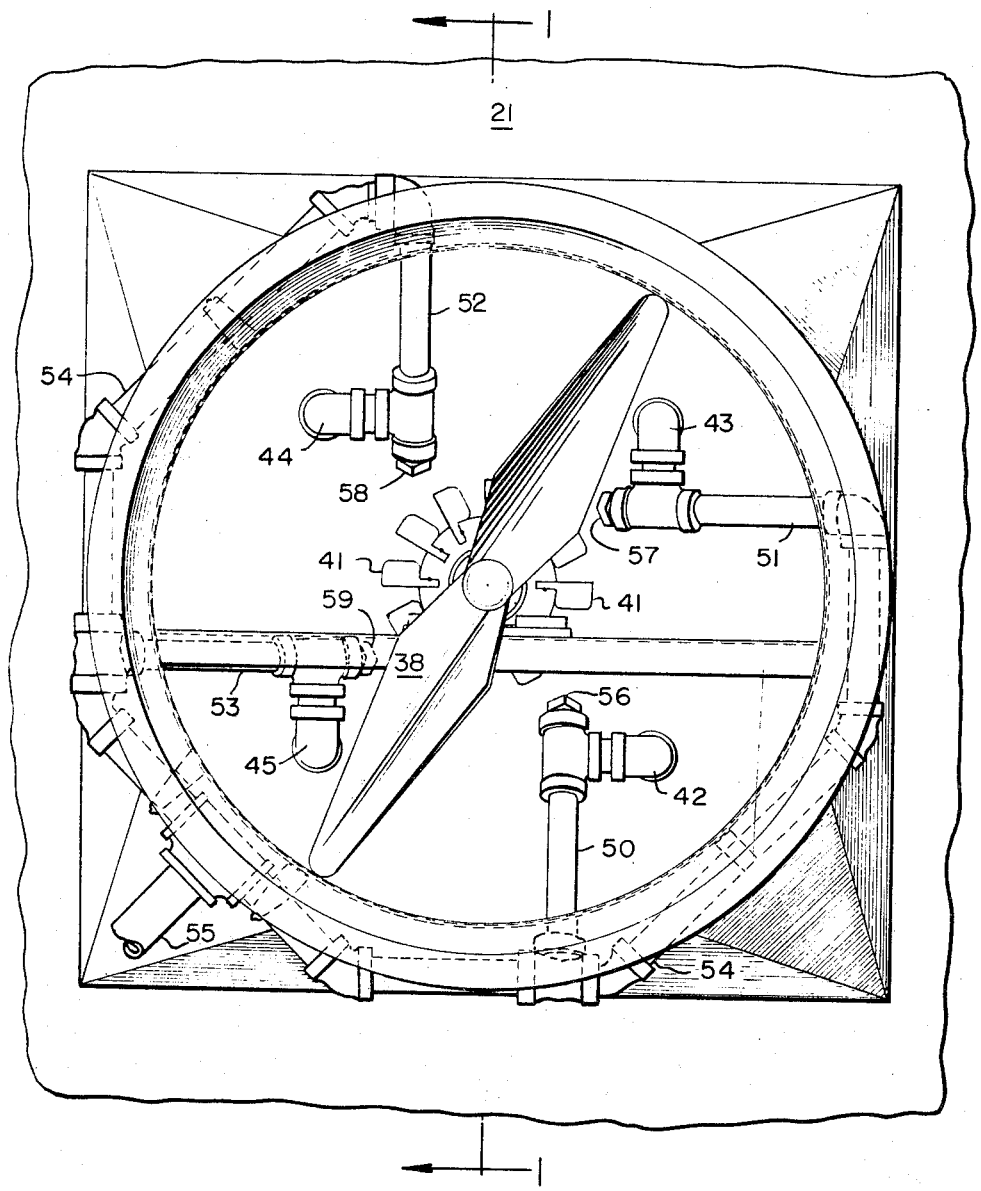
FIG. 3 is an end view from the intake end of the embodiment of FIG. 1.

Referring to the drawings in greater particularity, 20 generally indicates the novel foam generator mounted in a wall 21. This generator is preferably constructed as a sheet metal tube 22 which is constructed in three main sections, 23, 24 and 25. Section 23 is preferably cylindrical in cross-section, whereas section 25 is, in the preferred embodiment, square or rectangular in cross-section. Therefore, section 24 is an intermediate transition section. These sections are shown as joined by a unitized or welded construction. However, if necessary, the sections may be made as individual units joined by mechanical fasteners such as bolts.

Within section 23 is an axially oriented rotatable shaft 30 supported by spaced bearing blocks 31 and 32. These bearing blocks are in turn supported on a spider 34. At the inlet end 36 of the tube 22 a fan 38 is fastened to the shaft 30 to rotate with the shaft. At the other end of the shaft 30, normally located within the section 24, an impeller wheel 40 is fastened to the shaft. It will be understood that in operation, the fan 38 is constructed to create an airstream which travels through the tube 22 from the inlet 36 at the left in FIG. 1 to the outlet 60 at the right.

Extending from the circumferential shell of section 23, from a portion intermediate the fan 38 and impeller wheel 40, inwardly toward the axis of tube 22 and inclined toward the impeller wheel 40 are conduits 50, 51, 52 and 53. An exterior conduit 54 connects the conduits 50–53 with a feed-pipe 55 through which foam-making solution is introduced to the foam generator 20. Since the proportioning and composition of the foaming agent are not part of the present invention and well known devices and chemicals have been found suitable for such use in the present invention no further reference to this phase of foam generation is necessary.

Nozzles 56, 57, 58, 59 are fastened respectively to the ends of conduits 50, 51, 52, 53 and directed toward impeller wheel 40, so that the liquid discharged from the nozzles will impinge on the impeller blades 41. In addition, this preferred embodiment has nozzles 46, 47, 48, 49 also connected to conduits 50, 51, 52, 53, respectively, by elbows 42, 43, 44, 45, respectively. These nozzles, 46–49 are normally oriented horizontally to discharge liquid toward the discharge end 60, to impinge directly on screen 61.

Within section 25 is the metal wire woven screen 61 of a particular preferred construction which will be described hereafter. The particular screen illustrated in the drawings is formed in three sections indicated as 62, 63, 64. Section 62, which will be referred to as the base section, is fastened to the walls of tube section 25 in the illustrated embodiment at the juncture of sections 24 and 25. The fastening is accomplished by means of a frame 65 to which base section 62 is joined and which in turn is fastened to the walls of section 25. It will be seen that the sides of section 62 taper inwardly and terminate at a second frame 66, thus giving section 62 the shape of a frustum of a pyramid. Considering section 63, with frame 66 as its base, it is oriented in the opposite direction from section 62 and is contained within this section 62. The intermediate section 63 also tapers inwardly to a third frame 67 and therefore also takes the shape of a frustum of a pyramid. Section 64 which is here referred to as the apex section, uses frame 67 as its base and also tapers inwardly toward a tip 68 and is thus in the form of a pyramid.

Each of the screen sections, 62, 63, 64 is supported on its respective base frame 65, 66, 67 with the help of corner struts. Thus, base section 62 has corner struts 69, 70, 71 and 72 extending from frame 65 to frame 66; intermediate section 63 has corner struts 73, 74, 75 and 76 extending from frame 66 to frame 67; and, apex section 64 has corner struts 77, 78, 79 and 80 extending from frame 67 to the tip 68. The reentrant or reversely oriented pyramidal sections 62, 63, 64, have been found to be very effective in the production of foam. It will, of course be understood, that with different dimensions it may be desirable for the screen to have a plurality of reversely oriented intermediate sections rather than just the one presently shown and described.

The operation of this novel foam generator is normally initiated by well known heat detecting devices, (not shown) which are connected to a valve (this is not shown, but can be a well known deluge valve) which, upon opening due to a signal from the heat detectors, will permit water under pressure to flow to a proportioning device (not shown) where the water is mixed with a suitable amount of foaming agent and then led to feed pipe 55. From fed pipe 55 the liquid is passed to the exterior conduit 54 and then to conduits 50, 51, 52, 53, from which the liquid is discharged through nozzles 46, 47, 48, 49 and 56, 57, 58, 59. The latter four nozzles are directed at the impeller wheel 40 to discharge liquid so that it impinges directly on the buckets or blades 41.

Each of the blades is formed to contain compound curves (see FIGS. 9 and 10) to direct the liquid onto the screen as it is deflected from the blades. This action may be viewed as that of a modified form of Pelton wheel in that the liquid is in contact with the air and in flowing on the surfaces of the buckets from the leading edges 86 it is similar to open channel flow. Unlike the Pelton wheel however, all of the liquid kinetic energy is not transferred to the wheel to drive fan 38 but some is used to deflect and to carry the liquid onto the screen 61.

At times, this discharge may be sufficient to wet the screen 61 in a desired manner. However, occasions may arise when it may be necessary to supplement nozzles 56–59 with additional nozzles to adequately cover the screen with foam producing liquid. Such supplementary nozzles as 46–49 are normally directed horizontally at the screen and do not perfrom any function additional to wetting the screen.

The screen 61 is made of woven wire. In the illustrated preferred embodiment the screen is a standard 50 mesh screen which coutains .009″ wire and .011″ openings. In addition, at regular intervals, holes 80 are punched through the screen in a square pattern at a preferred spacing of $13/64''$. These holes are $1/8''$ in diameter. The size and spacing of these holes may be varied to some extent as also may the mesh size be varied. It has been found that wire meshes have a total mesh opening area of approximately 28% to 32% of the total screen area are effective as foam generator screens. Standard screen meshes in sizes from 50 mesh to 100 mesh generally fall within the opening percentiles stated above.

At the spacing of $13/64''$ between centers, the punched holes 80 at $1/8''$ diameter represent approximately 31% of the total screen area. It has been found that these apertures preferably should not be much smaller than $1/8''$ diameter nor much larger than $9/64''$ diameter, because of the effect on the quality of the foam. Broadly stated, it has been found that good quality foam is obtained where the area of the apertures make up approximately 20% to 33% of the total screen area so that the total opening area (mesh openings plus apertures) is approximately 42% to 55% of the total screen area.

It will be noted in FIGS. 4–6 that each hole 80 has protruding wire ends 81 extending toward the interior of the hole from its circumference. Looking carefully at FIGS. 4 and 5 it will be seen that because the screen wires are spaced apart in parallel they, in effect, form flow channels which are unobstructed at the openings 80. These flow channels are designated as 82.

It appears that the foam forming liquid when it is impinged on the screen will flow along the flow channels 82 drawn by the inherent surface tension and capillarity of the liquid to form film lenses over the openings 80. The airstream, initiated by fan 38, and passing through the openings 80 forms the foam by blowing the film lenses into bubbles. It further appears that the exposed wire ends 81 contribute to the above action.

FIG. 1 clearly shows that the fan 38 is driven through shaft 30 by the impeller wheel 40, thus creating the airstream which forms and moves the foam out of discharge end 60.

Succinctly, the operation contains the steps of liquid to the nozzles, discharge from the nozzles to the impeller wheel and screen, simultaneous rotation of the fan to create an airstream which is forced through the screen forming and moving a foam stream.

Figure 11:
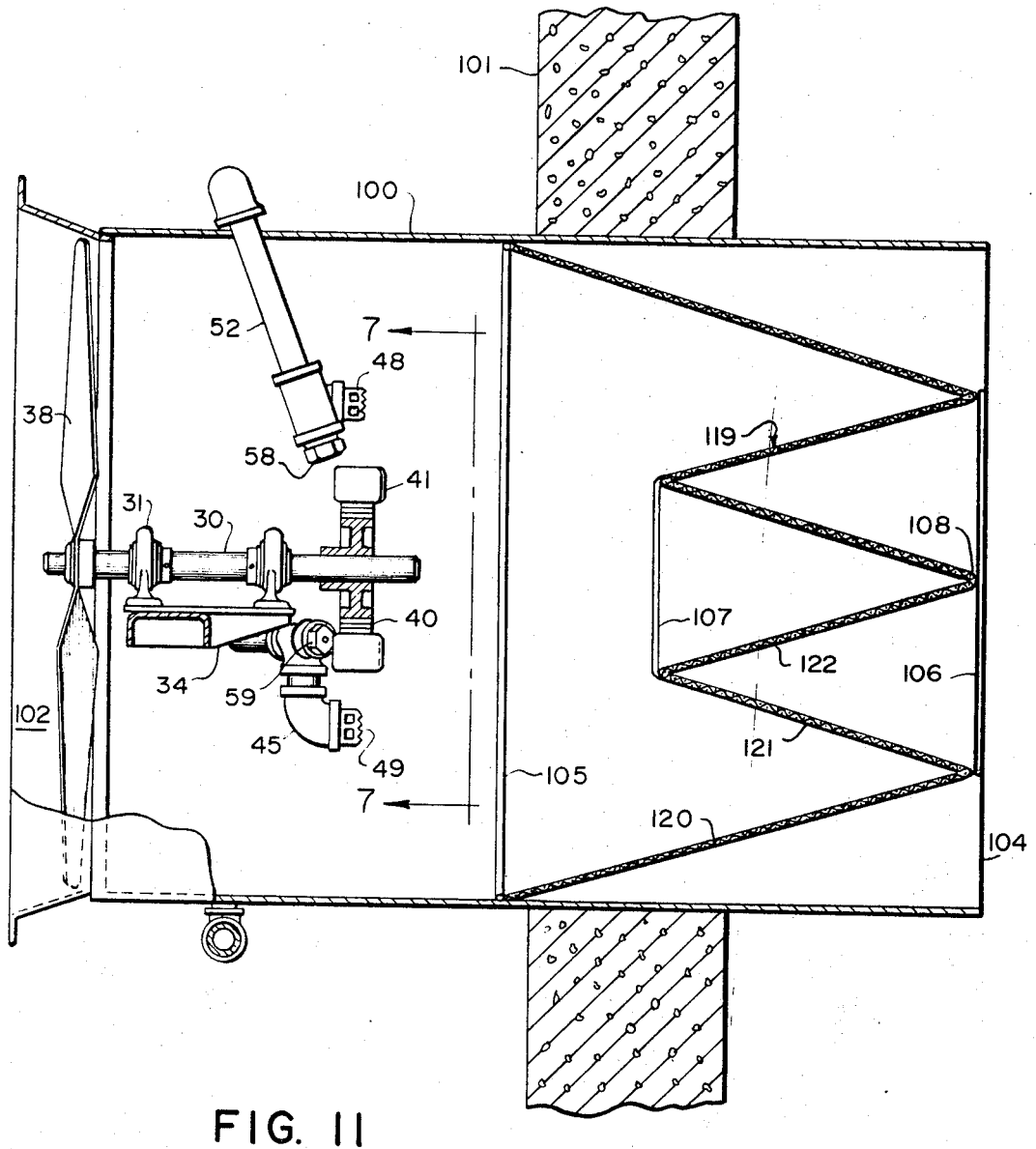
FIG. 11 is a cross-sectional elevation view of another embodiment of the invention installed in a building wall.
Figure 12:
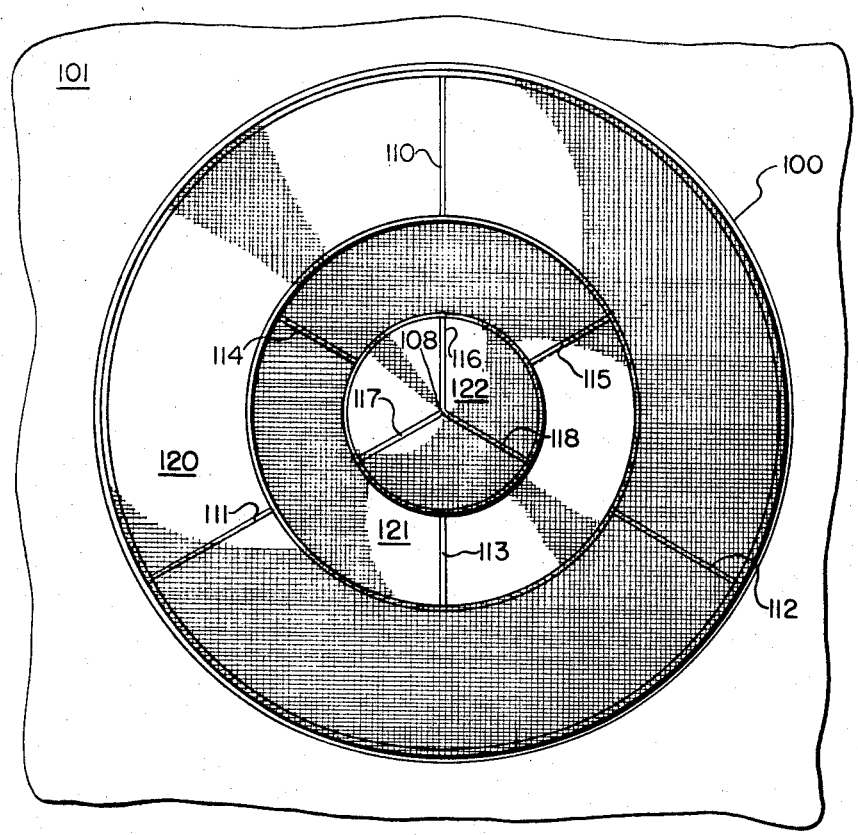
FIG. 12 is an end view from the discharge end of the embodiment of FIG. 11 showing the screen configuration in the discharge opening.
Figure 13:
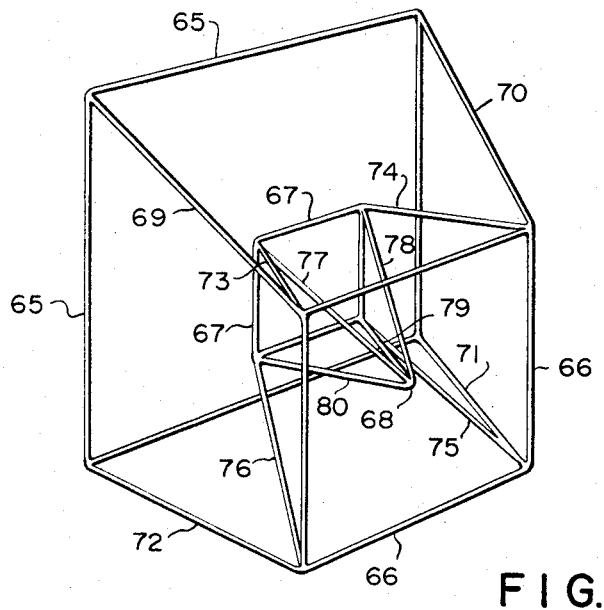
FIG. 13 is a perspective detail view of the support frame for the screen in FIGS. 1 and 2.
Figure 14:
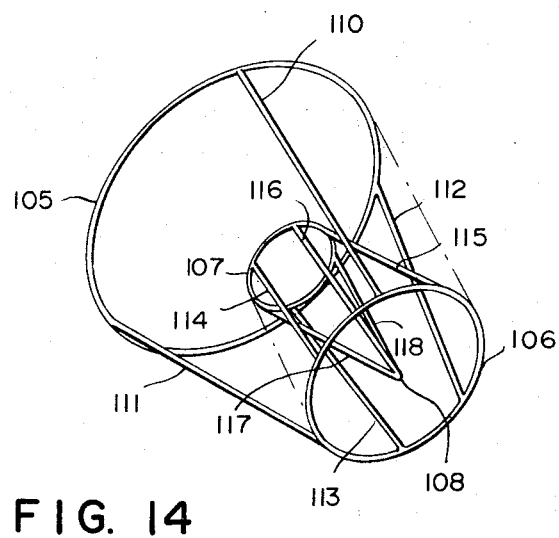
FIG. 14 is a perspective detail view of the support frame for the screen in FIGS. 11 and 12.

Referring now to FIGS. 11 and 12, a second embodiment is shown wherein the foam generator, is circular in cross-section throughout its length. As a result, the necessity for an intermediate transition section is eliminated and a smooth, straight-through cylindrical flow passageway can be obtained.

In this embodiment, 100 designates the cylindrical housing which is a single unit. To show the similarity of the various components used to make up this form of foam generator in comparison with the embodiment of FIGS. 1–10, the same numbers have been used to designate parts in this embodiment which are identical to corresponding parts in FIGS. 1–10. Thus, we find a fan 38 joined to a shaft 30. The shaft is rotatably mounted in bearing blocks 31 and 32 which are supported on a horizontal spider 34. The shaft extends from the inlet end 102 of the housing 100 to a point within the middle third of the housing. At the inner end of the shaft the impeller wheel 40 is mounted and fastened to the shaft by means of set screws threaded into holes 94 in the hub 92 (see FIG. 8).

As in the embodiment of FIGS. 1–10 the nozzles 56, 57, 58, 59 are directed at the buckets 41 of impeller wheel 40 to discharge liquid in streams which impinge on the buckets 41 and then are carried to the screen 119. FIG. 11 also shows the auxiliary nozzles 46–49 for distributing liquid directly on the screen 119. As with the embodiment of FIGS 1–10 such nozzles may be considered optional. The relationship of these nozzles is the same in both embodiments, and if FIG. 11 is viewed from its outlet end 104 the nozzles and impeller wheel have the same relationship as shown in FIG. 7.

The screen 119 is shown as made up in three sections indicated as 120, 121, 122. Section 120, which will be referred to as the base section, is fastened to a base frame 105 and the interior wall of cylinder housing 100. It will be seen in FIGS. 11 and 12 that the sides of section 120 taper inwardly and terminate at a second frame 106 thus giving section 120 the shape of a frustum of a cone. Considering section 121, with frame 106 as its base, it is oriented in the opposite direction from section 120 and is contained in this section 120. The intermediate section 121 also tapers inwardly to a third frame 107 and therefore also takes the shape of a frustum of a cone. Section 122 which is here referred to as the apex section, uses frame 67 as its base and also tapers inwardly toward a tip 108 and is thus in the form of a cone.

Each of the screen sections 120, 121, 122 is supported on its respective base frame 105, 106, 107 with the help of struts. Thus, base section 120 has three equally spaced struts 110, 111, and 112 extending from frame 105 to frame 106; intermediate section 121 has three equally spaced struts 113, 114, and 115 extending from frame 106 to frame 107; and apex section 122 has three equally spaced struts extending from frame 107 to the tip 108. Three struts have been indicated for each screen section. However, it should be obvious that under certain conditions only two struts may suffice and that more than three struts can be used if necessary.

As with the embodiment of FIGS. 1–10 it will be understood that with changes in dimensions it may be desirable or necessary to have a plurality of reversely oriented intermediate sections rather than just the one 121 shown and described.

It is to be understood that the above description and accompanying drawings are to be deemed primarily as illustrative of the prefered mode presently contemplated of carrying out the principles of the invention, and that the device described and illustrated may be modified or altered in its form, proportions, detail of construction and arrangement of parts without departing from the spirit and scope of the invention as defined in the appended claims.

We claim:
1. In a firefighting foam generating apparatus comprising a wind tunnel structure with an intake end and an outlet end, a fan at said inlet end for forcing air axially through said tunnel, a foam forming screen at the outlet end and nozzles between said fan and said screen for discharging foam forming solution, the improvements comprising:
(A) a rotatable longitudinal shaft coincident with the axis of said wind tunnel on which,
  (1) said fan is fixedly mounted at one end of said shaft at the intake end of said tunnel for rotation with said shaft,
  (2) an impeller wheel is fixedly mounted between said nozzles and said screen for rotating said shaft, said impeller wheel,
    (a) containing a plurality of curved blades mounted at equally spaced intervals on the circumference of said wheel,
(B) said nozzles being inwardly directed toward said impeller wheel blades to discharge said foam forming solution to impinge on said blades and thus rotate said impeller wheel,
(C) said nozzles and said curved blades being positionally related so that said solution is sprayed onto said screen after it impinges on said blades,
(D) said screen being of woven metal wire mesh,
  (1) with a total mesh opening area of approximately 28% to 32% of the screen area,
  (2) and containing additional apertures therethrough of a considerably larger size than the mesh openings, at spaced intervals,
whereby, as said solution is discharged from said nozzles and impinges on said blades of said impeller, the impeller is rotated, rotating said fan and creating an axial airstream through said wind tunnel structure, and said solution is deflected from said blades and is sprayed onto said screen, forming film lenses over said apertures which are formed into bubbles and carried out of said outlet end by said airstream.

2. Apparatus according to claim 1 wherein said screen is in the shape of the connected surfaces of a plurality of concentric reentrant regular solids.

3. Apparatus according to claim 1 wherein said screen is in the shape of the connected surfaces of a plurality of concentric reentrant frustums of solids terminating at an axially located apex.

4. In a firefighting foam generating apparatus comprising a wind tunnel structure with an intake end and an outlet end, a fan at said inlet end for forcing air axially through said tunnel, a foam forming screen at the outlet end and nozzles between said fan and said screen for discharging foam forming solution, the improvements comprising:
(A) a rotatable longitudinal shaft coincident with the axis of said wind tunnel on which, (1) said fan is fixedly mounted at one end of said shaft at the intake end of said tunnel for rotation with said shaft, (2) an impeller wheel is fixedly mounted between said nozzles and said screen for rotating said shaft, said impeller wheel, (a) containing a plurality of curved blades mounted at equally spaced intervals on the circumference of said wheel, (B) said nozzles being inwardly directed toward said impeller wheel blades to discharge said foam forming solution to impinge on said blades and thus rotate said impeller wheel, (C) said nozzle and said curved blades being positionally related so that said solution is sprayed onto said screen after it impinges on said blades, (D) said screen being of woven metal wire mesh, (1) in the range of approximately 50 to 100 mesh with a total mesh opening area of approximately 28% to 32% of the screen area (2) and containing additional apertures therethrough at spaced intervals, said apertures, (a) being considerably larger than the mesh openings, (b) comprising an aperture opening area approximately 20% to 33% of the total screen area, and (c) comprising together with said mesh openings a total opening value of approximately 42% to 55% of the total screen area, whereby, as said solution is discharged from said nozzles and impinges on said blades of said impeller, the impeller is rotated, rotating said fan and creating an axial airstream through said wind tunnel structure, and said solution is deflected from said blades and is sprayed onto said screen, forming film lenses over said apertures which are formed into bubbles and carried out of said outlet end by said airstream.

5. Apparatus according to claim 4, further comprising additional nozzles between said fan and said screen for spraying foam forming solution directly on said screen.

6. Apparatus according to claim 4 wherein said screen is in the shape of the connected surfaces of a plurality of concentric reentrant regular solids.

7. Apparatus according to claim 4 wherein said screen is in the shape of the connected surfaces of a plurality of concentric reentrant frustums of solids terminating at an axially located apex.

8. Apparatus according to claim 7 wherein said screen apertures are in a range of approximately $\frac{1}{8}''$ to $\frac{9}{64}''$ in diameter.

9. Apparatus according to claim 8 wherein said solids are pyramids.

10. Apparatus according to claim 8 wherein said solids are cones.

11. Apparatus according to claim 5 wherein said screen is in the shape of the connected surfaces of a plurality of concentric reentrant frustums of solids terminating at an axially located apex.

12. Apparatus according to claim 11 wherein said screen apertures are in a range of approximately $\frac{1}{8}''$ to $\frac{9}{64}''$ in diameter.

13. Apparatus according to claim 12 wherein said solids are pyramids.

14. Apparatus according to claim 12 wherein said solids are cones.

References Cited

UNITED STATES PATENTS

| | | | |
|---|---|---|---|
| 1,761,179 | 6/1930 | Burmeister | 169—15 |
| 1,882,911 | 10/1932 | Richards | 169—15 X |
| 2,183,561 | 12/1939 | Hamblin | 169—15 X |
| 2,988,343 | 6/1961 | Edwards et al. | 169—15 X |
| 3,342,271 | 9/1967 | Anthony | 169—15 |

ALLEN N. KNOWLES, *Primary Examiner.*

U.S. Cl. X.R.

239—504; 169—2